F. B. GLOVER.
WORK HOLDER.
APPLICATION FILED APR. 8, 1919.
1,350,097. Patented Aug. 17, 1920.
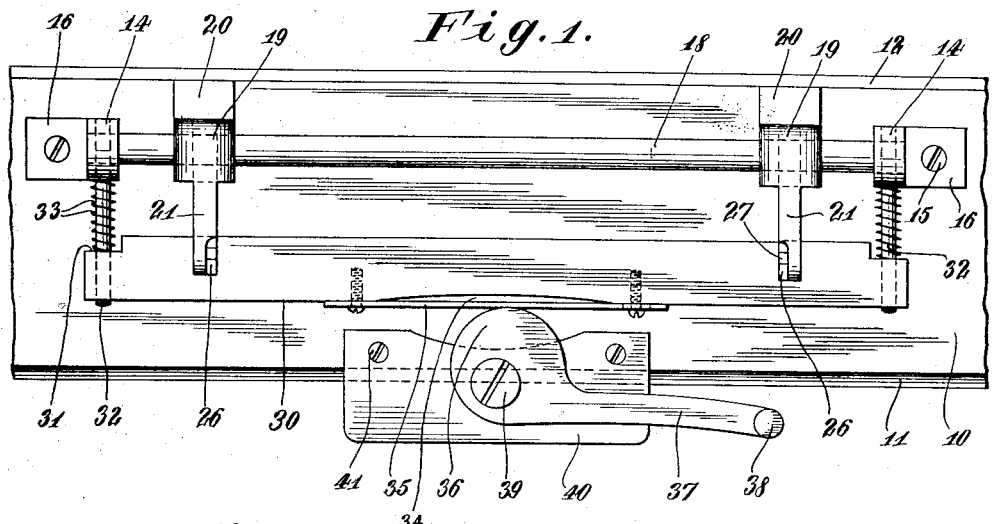
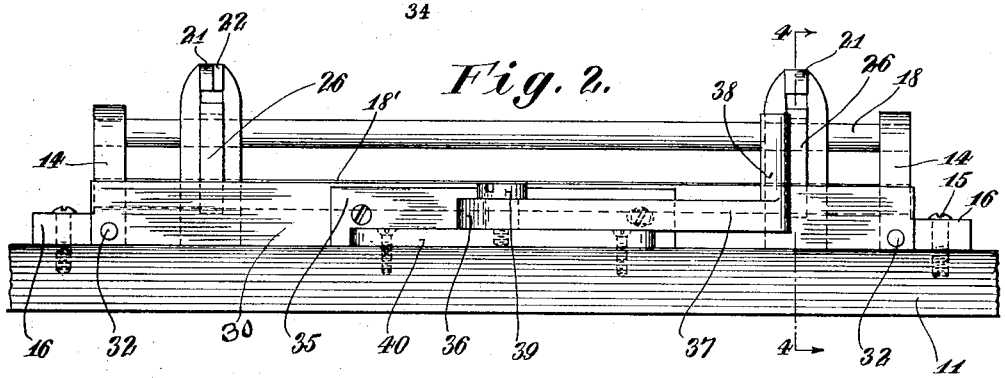
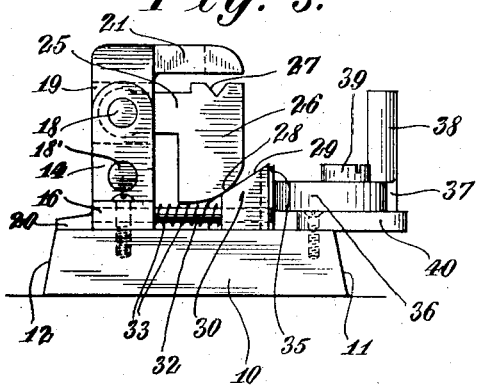
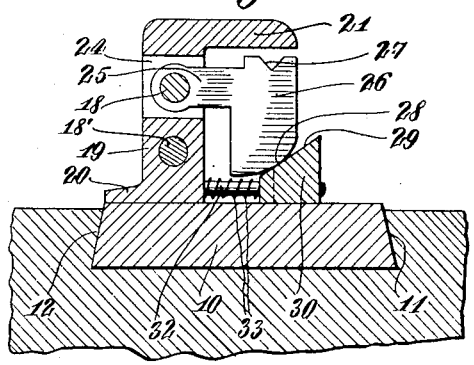
INVENTOR
Frank B. Glover.
BY
Eugene Beart
ATTORNEY

UNITED STATES PATENT OFFICE.

FRANK B. GLOVER, OF BROOKLYN, NEW YORK.

WORK-HOLDER.

1,350,097.  Specification of Letters Patent.  Patented Aug. 17, 1920.

Application filed April 8, 1919. Serial No. 288,622.

*To all whom it may concern:*

Be it known that I, FRANK B. GLOVER, a citizen of the United States, residing in Brooklyn, in the county of Kings and State of New York, have invented certain new and useful Improvements in Work-Holders, of which the following is a specification.

This invention relates to improvements in work holders, vises for supporting fixtures, in which objects are securely held during the performance of mechanical operations thereon.

The principal object of the invention is to provide a work holder or vise in which elongated cylindrical objects may be firmly clamped in an easy and rapid manner so as to hold the same securely by a single operation.

A further object is to provide a vise fixture so arranged that the upper peripheral surfaces of cylindrical objects are always maintained at a uniform height with respect to the fixture, notwithstanding differences in their diameters, and Finally to provide a vise or clamp fixture particularly adapted for engraving machines to hold glass tubes while being marked with scales, lines, numerals or other characters.

These and other like objects, which will become more fully manifest as the description progresses, are attained by the novel construction and combination of parts hereinafter described and shown in the accompanying drawings, forming a material part of this specification and in which,—

Figure 1 is a top plan view showing a work holding fixture made in accordance with the invention.

Fig. 2 is a front elevational view of the same.

Fig. 3 is an end view thereof, and

Fig. 4 is a transverse sectional view taken on line 4—4 of Fig. 2.

The work holding fixture illustrated is here shown to consist of a rigid slide or base plate 10, substantially rectangular in plan and formed with longitudinally beveled side edges 11 and 12, respectively at the front and rear, the same being supported and guided in a suitable slideway forming a fixed portion of the machine in which the work operations are to be performed.

Secured to the upper surface of the base plate 10, are a pair of brackets 14, the same being held by screws 15, passing through their flanged elements 16, which are arranged near the rear edge 12 of the base plate, the vertical elements 14 being connected by rigid cylindrical rods 18 and 18', the same acting as supports for a pair of brackets 19, slidably engaged thereon and having flanged feet portions 20 resting upon the level upper surface of the base plate 10, to which they may be secured if desired.

Formed with the brackets 19 are forwardly extending rigid jaws or horizontal projections 21, the same being narrower than the brackets 19 and cut partially away on their inner adjacent sides, as at 22, in order to enable a cutting tool or the like to operate nearly to the extremity of the article held therebelow.

Formed in each of the brackets 19, is a transverse opening 24, through the center of which the rod 18 passes and pivoted thereon, within the recesses 24, are the ends of arms 25, extending from clamp jaws 26, the same being arranged below and substantially in vertical alinement with the rigid jaws 21.

Formed in the upper surface of the swinging clamp jaws 26, are V shaped transverse recesses 27, adapted to hold cylindrical articles which are pressed upwardly against the fixed jaws in the following manner:—

The lower front corners 28 of the clamp jaws 26, are formed with a convex surface having a relatively large radius in the manner of cams and are adapted to make contact with the beveled surface 29 of a bar 30, arranged to slide laterally on the upper surface of the base plate 10, the ends 31 of the bar being reduced, and drilled to receive pins 32, fixed horizontally in the lower portion of the brackets 14.

These pins are encircled by coiled compression springs 33, adapted to press the beveled bar 30 normally outward and away from the clamp jaws 26, permitting the same to drop by gravity when in a free condition.

Fixed centrally on the front of the bar 30, so as to bridge a convex recess 34 formed therein, is a stiff flat spring 35, secured by screws in such manner as to permit it to spring into the recess if excessive pressure be applied, the spring being engageable by the face of a cam 36, with which is formed a lever-like extension 37, having at its extremity a raised post or operating handle 38, by which the cam may be rotated upon its pivot screw 39, the same being shouldered and having its screw threaded portion fixed in a plate 40, secured to the top of the base 10, and extending outward over its front edge 11, the plate being held in operative position by screws 41 or equivalent fastening means.

In operation, when it is desired to clamp an elongated cylindrical article in the fixture, the handle 38 is manipulated so as to turn the cam 36 away from the bar 30, the springs 33 causing the bar to follow the retreating profile of the cam and allowing the swinging clamp jaws 26 to partially rotate upon the bar 18, moving down by gravity and permitting an article to be placed in the V shaped recesses 27, whereupon the handle is moved reversely, causing the cam to make forcible contact with the spring plate 35, arranged to yield under pressure sufficient to damage the work part held, but which normally acts to force the bar laterally rearward, its inclined surface 29, contacting with the lower rounded corners 28 of the swinging clamp jaws, forcing them upward and clamping the work resting in the V shaped grooves firmly against the rigid overhanging jaws 21 in an obvious manner.

From the foregoing it will be understood that cylindrical articles, varying considerably in their diameters, may be held safely with equal security and, as the projecting jaws 21 are rigidly fixed with relation to the base 10, the upper exposed longitudinal portion of the objects held, irrespective of their diameters, will invariably be in the same plane.

It will be apparent that the work holding fixture may be used for many other purposes than that mentioned, as for milling, profiling, engraving and other mechanical operations in which it is desirable that the article operated on be firmly and securely held at a uniform height relative to their upper surface and the work table support or base. It will be understood that the particular form or construction of the base is immaterial, and that the entire foregoing description is to be regarded as illustrative rather than restrictive, as obviously modifications may be made without detracting from the spirit of the invention set forth.

Having thus described my invention, what I claim as new and desire to secure by Letters Patent, is:—

1. A work holding fixture comprising a level rectangular, slidably mounted base, two or more rigid horizontal jaws movably mounted on said base to extend transversely over its upper surface, said jaws having level lower surfaces, and means for forcing objects against the lower surfaces of said rigid jaws whereby the objects may be held so that their upper surfaces are invariably at a fixed distance from said base, irrespective of their diameters.

2. A work holder comprising a base, a pair of brackets fixed thereon, a pair of rods extending rigidly between said brackets, a second pair of brackets adjustable on said rods and base, jaws extending rigidly outward from said movable brackets, clamp jaws pivoted in said movable brackets cooperative with said rigid jaws, and means for simultaneously raising or lowering said clamp jaws.

3. A work holder comprising a base, a pair of rigid jaws longitudinally adjustable thereon, the lower surface of said jaws being in a plane parallel to said base, a pair of swinging jaws pivoted below said rigid jaws, cam elements formed with said swinging jaws, a bar movable laterally on said base having an inclined face contactable with said cam elements, means for moving said bar laterally, and a spring plate interposed between said cam elements and said moving means.

4. A work holder comprising an elongated base, rods rigidly supported above and parallel thereto, brackets slidably mounted on said rods, said brackets being in contact with said base, clamp jaws pivoted on one of said rods within said brackets, said jaws having transverse V grooves in their upper portions and convex lower front corners, rigid jaws formed with said brackets extending over said clamp jaws, a bar movable laterally on said base, said bar having a beveled upper surface engageable with the convex corners of said clamp jaws, means for normally pressing said bar out of engagement with said clamp jaws, a manually operable cam for forcing said bar against said clamp jaws whereby they are raised relative to said rigid jaws, and a resilient element interposed between said bar and said cam.

5. A work holder comprising a rigid rectangular level base, a pair of brackets secured thereon, rods fixed in said brackets, other brackets adjustable on said rods and base, rigid jaws extending toward the front of said base from said second brackets, said rigid jaws being relatively narrow and having a lower level surface parallel with said base, arms pivoted in said second brackets on one of said rods, heads formed with said arms, said heads being in vertical register with said rigid jaws and containing transverse grooves, cam profiles formed at the lower front corners of said heads, a bar having a beveled upper surface contactable with said heads, means for normally pressing said bar away from said heads, a cam adapted to force said bar laterally on said base against said heads whereby they are simultaneously raised, and manually operable means for actuating said cam.

6. A work holder comprising an elongated rectangular base arranged to slide horizontally, jaws extending transversely over said base, clamp jaws interengaged and coöperative with said fixed jaws, and means for actuating said clamp jaws, relative to said fixed jaws.

7. A work holder comprising a slidably mounted, level surfaced base, rigid jaws adjustable longitudinally on said base and extending transversely thereover, clamp jaws coöperative with said rigid jaws, means for raising said clamp jaws resiliently and means for retracting said raising means.

In testimony whereof I have signed my name to this application.

FRANK B. GLOVER.